(12) United States Patent
Cook et al.

(10) Patent No.: US 8,004,515 B1
(45) Date of Patent: Aug. 23, 2011

(54) STEREOSCOPIC VERTEX SHADER OVERRIDE

(75) Inventors: David R. Cook, San Jose, CA (US); Mikhail V. Krivega, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 307 days.

(21) Appl. No.: 11/081,344

(22) Filed: Mar. 15, 2005

(51) Int. Cl.
G06T 15/00 (2011.01)
G06T 15/50 (2011.01)
H04N 13/00 (2006.01)
H04N 13/04 (2006.01)
G03B 35/00 (2006.01)

(52) U.S. Cl. ............ 345/419; 345/426; 348/42; 348/51; 352/57

(58) Field of Classification Search .................. 345/419, 345/426; 359/466; 348/42, 51; 352/57; 355/22; 382/154
See application file for complete search history.

(56) References Cited

U.S. PATENT DOCUMENTS

| | | | | |
|---|---|---|---|---|
| 5,257,345 A * | 10/1993 | Malm | ............................ | 345/419 |
| 5,523,886 A * | 6/1996 | Johnson-Williams et al. | ............................ | 359/464 |
| 5,742,331 A * | 4/1998 | Uomori et al. | ................... | 348/51 |
| 5,748,199 A * | 5/1998 | Palm | ............................ | 345/473 |
| 6,031,564 A * | 2/2000 | Ma et al. | ........................... | 348/43 |
| 6,108,005 A * | 8/2000 | Starks et al. | .................... | 345/419 |
| 6,198,484 B1 * | 3/2001 | Kameyama | ..................... | 345/419 |
| 6,396,502 B1 * | 5/2002 | Cunniff | .......................... | 345/582 |
| 6,466,205 B2 * | 10/2002 | Simpson et al. | ............... | 345/419 |
| 6,496,598 B1 * | 12/2002 | Harman | ......................... | 382/154 |
| 6,515,662 B1 * | 2/2003 | Garland | ......................... | 345/427 |
| 6,603,475 B1 * | 8/2003 | Han et al. | ....................... | 345/422 |
| 6,717,728 B2 * | 4/2004 | Putilin | ........................... | 359/462 |
| 6,731,303 B1 * | 5/2004 | Marino | .......................... | 345/620 |
| 6,793,350 B1 * | 9/2004 | Raskar et al. | ................. | 353/121 |
| 6,809,732 B2 * | 10/2004 | Zatz et al. | ...................... | 345/503 |
| 6,819,325 B2 * | 11/2004 | Boyd et al. | .................... | 345/559 |
| 6,825,843 B2 * | 11/2004 | Allen et al. | .................... | 345/522 |
| 6,831,635 B2 * | 12/2004 | Boyd et al. | .................... | 345/418 |
| 6,839,062 B2 * | 1/2005 | Aronson et al. | .............. | 345/522 |
| 6,867,750 B2 * | 3/2005 | Noro | .............................. | 345/419 |
| 6,917,715 B2 * | 7/2005 | Berstis | ........................... | 382/239 |
| 6,919,907 B2 * | 7/2005 | Berstis | .......................... | 345/619 |
| 6,943,800 B2 * | 9/2005 | Taylor et al. | ................... | 345/543 |
| 6,963,345 B2 * | 11/2005 | Boyd et al. | .................... | 345/559 |
| 7,009,605 B2 * | 3/2006 | Dietrich et al. | ................ | 345/419 |
| 7,015,909 B1 * | 3/2006 | Morgan, III et al. | .......... | 345/426 |
| 7,034,828 B1 * | 4/2006 | Drebin et al. | ................. | 345/426 |
| 7,129,981 B2 * | 10/2006 | Berstis | ..................... | 348/333.12 |
| 7,159,212 B2 * | 1/2007 | Schenk et al. | ................. | 717/153 |
| 7,176,919 B2 * | 2/2007 | Drebin et al. | ................. | 345/426 |

(Continued)

OTHER PUBLICATIONS

Hodges, "Tutorial: Time-Multiplexed Stereoscopic Computer Graphics", IEEE Computer Graphics and Applications, vol. 12, Issue 2, Mar. 1992, pp. 20-30.*

(Continued)

*Primary Examiner* — Ulka Chauhan
*Assistant Examiner* — Roberta Prendergast
(74) *Attorney, Agent, or Firm* — Patterson & Sheridan, LLP

(57) ABSTRACT

A system and method that produces stereoscopic images modifies a vertex shader program that was intended to produce a single monoscopic image. When executed, the modified vertex shader program generates a first image of a stereoscopic image pair based on a first viewpoint and generates a second image of the stereoscopic image pair based on a second viewpoint.

8 Claims, 5 Drawing Sheets

U.S. PATENT DOCUMENTS

| | | | |
|---|---|---|---|
| 2001/0033327 A1* | 10/2001 | Uomori et al. | 348/47 |
| 2001/0052899 A1* | 12/2001 | Simpson et al. | 345/419 |
| 2002/0036648 A1* | 3/2002 | Putilin | 345/629 |
| 2002/0075308 A1* | 6/2002 | Divelbiss et al. | 345/762 |
| 2003/0020741 A1* | 1/2003 | Boland et al. | 345/700 |
| 2003/0038798 A1* | 2/2003 | Besl et al. | 345/426 |
| 2003/0198393 A1* | 10/2003 | Berstis | 382/239 |
| 2004/0169650 A1* | 9/2004 | Bastos et al. | 345/426 |
| 2004/0246253 A1* | 12/2004 | Mizukami | 345/441 |
| 2005/0122395 A1* | 6/2005 | Lipton et al. | 348/59 |

OTHER PUBLICATIONS nVidia Technical Brief, "3D Stereo", Consumer Stereoscopic 3D Solution, www.nvidia.com/object/3d_stereo.html, 2003, 13 pages.*

Adelson and Hansen, 1994 "Fast stereoscopic images with ray-traced volume rendering", Proceedings of the 1994 Symposium on Volume Visualization. Eds. A. Kaufman and W. Krueger, ACM Press, NY, NY, 8 pages.*

Halle, M., 1997, "Autostereoscopic displays and computer graphics", SIGGRAPH Computer Graphics, vol. 31, Issue 2 (May 1997), pp. 58-62.*

Halle, M., 1998, "Multiple viewpoint rendering", Proceedings of the 25th Annual Conference on Computer Graphics and Interactive Techniques, SIGGRAPH '98, ACM Press, NY, NY, pp. 243-254.*

Wartell, Z., et al., 1999, "Balancing fusion, image depth and distortion in stereoscopic head-tracked displays", Proceedings of 26th Annual Conference on Computer Graphics and Interactive Techniques, ACM Press/Addison-Wesley Publishing Co., NY, NY, pp. 351-358.*

Lo, C. H. and Chalmers, A., "Stereo vision for computer graphics: the effect that stereo vision has on human judgments of visual realism", Proceedings of the 19th Spring Conference on Computer Graphics (Apr. 2003), L. Szirmay-Kalos, Ed., ACM Press, NY, NY, pp. 109-117.*

Maughan et al., "Vertex Shader Introduction", nVidia White Papers, May 15, 2001, http://www.nvidia.com/object/Intro_Vertex_Shaders.html, 13 pages.* nVIDIA Corporation, "Technical Brief: NVIDIA CineFX Shaders", Jan. 22, 2003, http://www.nvidia.com/object/feature_cinefx.html, 31 pages.*

Goetz, F., Borau, R., and Domik, G., "An XML-based visual shading language for vertex and fragment shaders", Proceedings of the Ninth international Conference on 3D Web Technology, (Apr. 2004), Web3D '04, ACM Press, NY, NY, pp. 87-97.*

Lindholm, E., Kligard, M. J., and Moreton, H., 2001, "A user-programmable vertex engine", Proceedings of the 28th Annual Conference on Computer Graphics and interactive Techniques, SIGGRAPH '01, ACM, New York, NY, pp. 149-158.*

McCool, et al., "Shader metaprogramming", Proceedings of the ACM SIGGRAPH/EUROGRAPHICS Conference on Graphics Hardware, Sep. 1-2, 2002, Eurographics Association, Aire-la-Ville, Switzerland, pp. 57-68.*

Mark, W. R., Glanville, R. S., Akeley, K., and Kilgard, M. J. 2003. Cg: a system for programming graphics hardware in a C-like language. In ACM SIGGRAPH 2003 Papers (San Diego, California, Jul. 27-31, 2003). SIGGRAPH '03. ACM, New York, NY, 896-907.*

NVIDIA, 2003, NVIDIA 3D Stereo User's Guide (for Detonator FX), Revision 3.1, NVIDIA Corporation, Aug. 11, 2003, 3 pages, retrieved Dec. 18, 2010 from: http://http.download.nvidia.com/stereo/45.23/NVIDIA_3D_Stereo_Users_Guide_v45.23.pdf.*

NVIDIA, copyright 2005, "NVIDIA GPU Programming Guide Version 2.4.0", NVIDIA Corporation, 79 pages, retrieved Dec. 17, 2010 from: http://web.archive.org/web/*/http://developer.download.nvidia.com/GPU_Programming_Guide/GPU_Programming_Guide.pdf.*

* cited by examiner

STEREOSCOPIC VERTEX SHADER OVERRIDE

BACKGROUND OF THE INVENTION

1. Field of the Invention

Embodiments of the present invention generally relate to graphics image generation and, more specifically, to the generation of stereoscopic graphics images.

2. Description of the Related Art

Conventional three-dimensional (3D) graphics processing includes producing stereoscopic image pairs using a fixed function graphics pipeline. A first image of the stereoscopic image pair is generated based on a first viewpoint and a second image of the stereoscopic image pair is generated based on a second viewpoint. FIG. 1 is a conceptual diagram of a prior art stereoscopic image projection in the xz plane in accordance with one or more aspects of the present invention. An object 130 is projected onto an image plane 100 viewed from a first viewpoint 120 corresponding to a viewer's left eye and a second viewpoint 115 corresponding to a viewer's right eye. Points 110 and 105 represent the position of object 130 in image plane 100 for each of the two different viewpoints.

A stereoscopic image pair corresponding to a single monoscopic image may be generated by a fixed function graphics pipeline by changing the viewpoint transformation matrix used to compute vertex positions of an object, such as object 130. Therefore, a graphics application program, such as a computer game program, intended to generate only monoscopic images may be used to generate stereoscopic images without any modification. Specifically, each image is generated twice, using two different viewpoint matrices to generate the stereoscopic image pair. Generation of the stereoscopic image pair is controlled by the graphics processor device driver and does not require any changes to the graphics application program.

With the advent of programmable graphics pipelines that are configured using vertex shader programs, the transformation matrix is not easily changed by the device driver in order to compute different vertex positions for an object. The graphics application program must therefore be designed to include stereoscopic support rather than relying on the device driver for stereoscopic support.

Accordingly, there is a need to configure a graphics processing pipeline to generate stereoscopic images using a vertex shader program, thereby enabling a graphics application program intended for monoscopic image generation to be used to generate stereoscopic image pairs.

SUMMARY OF THE INVENTION

The current invention involves new systems and methods for generating stereoscopic graphics images. A graphics driver may modify a vertex shader program that generates one or more monoscopic images to produce stereoscopic image pairs. The vertex shader program may be used to dynamically render one or more stereoscopic image pairs including 3D graphics primitives. The x coordinate computation for vertices is modified to generate a first x coordinate corresponding to a first viewpoint and a second x coordinate corresponding to a second viewpoint. Furthermore, the x coordinate computation for vertices may be controlled by user-provided parameters.

Various embodiments of a method of the invention for modifying a vertex shader program to produce stereoscopic image pairs include identifying a vertex shader program instruction in the vertex shader program that computes an x coordinate value of a vertex for a graphics primitive. These embodiments also include the step of modifying the vertex shader program to produce a modified vertex shader program that, when executed, computes a first x coordinate value for a first stereoscopic image of a stereoscopic image pair and computes a second x coordinate value for a second stereoscopic image of the stereoscopic image pair.

Various embodiments of the invention include a system for producing stereoscopic images including a position computation unit. The position computation unit is configured to compute a first x coordinate and a second x coordinate for a graphics primitive vertex by summing a monoscopic x coordinate value with a product of a parameter and a depth function, where the first x coordinate corresponds to a left eye viewpoint and the second x coordinate corresponds to a right eye viewpoint.

Various embodiments of a method of the invention for executing a vertex shader program to produce a stereoscopic image pair include executing the vertex shader program to produce a first image of the stereoscopic image pair corresponding to a first viewpoint using a parameter set to a first value, changing the parameter to a second value, and executing the vertex shader program to produce a second image of the stereoscopic image pair corresponding to a second viewpoint using the parameter set to the second value.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

A system and method to produce stereoscopic image pairs modifies a vertex shader program intended to produce one or more monoscopic images for a graphics application program.

The vertex shader program may be used to dynamically render one or more stereoscopic image pairs including 3D graphics primitives. The vertex shader program is modified to generate a first image of a stereoscopic image pair based on a first viewpoint and to generate a second image of the stereoscopic image pair based on a second viewpoint. The vertex shader program may be modified by a device driver during a preprocessing step and user-provided parameters may be used to control characteristics of the stereoscopic image generation.

Figure 2:
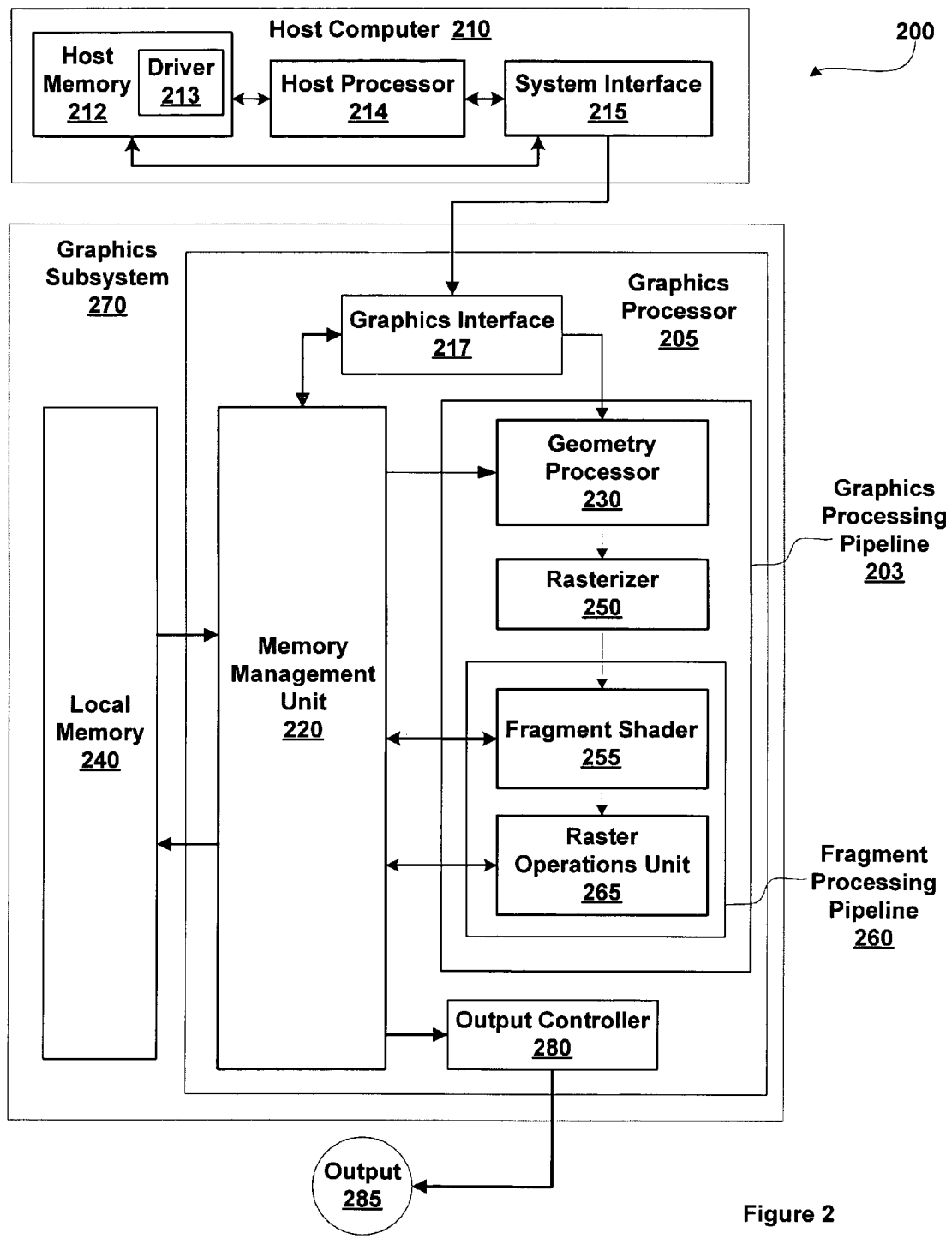
FIG. 2 is a block diagram of a graphics processing system in accordance with one or more aspects of the present invention.

FIG. 2 is a block diagram of an exemplary embodiment of a respective computer system, generally designated 200, and including a host computer 210 and a graphics subsystem 270 in accordance with one or more aspects of the present invention. Computing system 200 may be a desktop computer, server, laptop computer, palm-sized computer, tablet computer, game console, portable wireless terminal such as a PDA or cellular telephone, computer based simulator, or the like. Host computer 210 includes host processor 214 that may include a system memory controller to interface directly to host memory 212 or may communicate with host memory 212 through a system interface 215. System interface 215 may be an I/O (input/output) interface or a bridge device including the system memory controller to interface directly to host memory 212. An example of system interface 215 known in the art includes Intel® Northbridge.

A graphics device driver, driver 213, interfaces between processes executed by host processor 214, such as application programs, and a programmable graphics processor 205, translating program instructions as needed for execution by programmable graphics processor 205. Driver 213 also uses commands to configure sub-units within programmable graphics processor 205. Specifically, driver 213 may insert a fence instruction to constrain scheduling execution of a particular program instruction within an instruction sequence, as described in conjunction with FIG. 3.

Graphics subsystem 207 includes a local memory 240 and programmable graphics processor 205. Host computer 210 communicates with graphics subsystem 270 via system interface 215 and a graphics interface 217 within programmable graphics processor 205. Data, program instructions, and commands received at graphics interface 217 can be passed to a graphics processing pipeline 203 or written to a local memory 240 through memory management unit 220. Programmable graphics processor 205 uses memory to store graphics data, including texture maps, and program instructions, where graphics data is any data that is input to or output from computation units within programmable graphics processor 205. Graphics memory is any memory used to store graphics data or program instructions to be executed by programmable graphics processor 205. Graphics memory can include portions of host memory 212, local memory 240 directly coupled to programmable graphics processor 205, storage resources coupled to the computation units within programmable graphics processor 205, and the like. Storage resources can include register files, caches, FIFOs (first in first out memories), and the like.

In addition to Interface 217, programmable graphics processor 205 includes a graphics processing pipeline 203, a memory controller 220 and an output controller 280. Data and program instructions received at interface 217 can be passed to a geometry processor 230 within graphics processing pipeline 203 or written to local memory 240 through memory controller 220. In addition to communicating with local memory 240, and interface 217, memory controller 220 also communicates with graphics processing pipeline 203 and output controller 280 through read and write interfaces in graphics processing pipeline 203 and a read interface in output controller 280.

Within graphics processing pipeline 203, geometry processor 230 and a programmable graphics fragment processing pipeline, fragment processing pipeline 260, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 230 and fragment processing pipeline 260 are optionally configured such that data processing operations are performed in multiple passes through graphics processing pipeline 203 or in multiple passes through fragment processing pipeline 260. Each pass through programmable graphics processor 205, graphics processing pipeline 203 or fragment processing pipeline 260 concludes with optional processing by a raster operations unit 265.

Vertex shader programs are sequences of vertex program instructions compiled by host processor 214 for execution within geometry processor 230 and rasterizer 250. Fragment shader programs are sequences of fragment program instructions compiled by host processor 214 for execution within fragment processing pipeline 260. Geometry processor 230 receives a stream of program instructions (vertex program instructions and fragment program instructions) and data from interface 217 or memory controller 220, and performs vector floating-point operations or other processing operations using the data. The program instructions configure sub-units within geometry processor 230, rasterizer 250 and fragment processing pipeline 260. The program instructions and data are stored in graphics memory, e.g., portions of host memory 212, local nemory 240, or storage resources within programmable graphics processor 205. When a portion of host memory 212 is used to store program instructions and data the portion of host memory 212 can be uncached so as to increase performance of access by programmable graphics processor 205. Alternatively, configuration information is written to registers within geometry processor 230, rasterizer 250 and fragment processing pipeline 260 using program instructions, encoded with the data, or the like.

Data processed by geometry processor 230 and program instructions, such as primitive vertex data transformed into screen space, are passed from geometry processor 230 to a rasterizer 250. Rasterizer 250 is a sampling unit that processes primitives and generates sub-primitive data, such as fragment data, including parameters associated with fragments (texture identifiers, texture coordinates, and the like). Rasterizer 250 converts the primitives into sub-primitive data by performing scan conversion on the data processed by geometry processor 230. Rasterizer 250 outputs fragment data and fragment program instructions to fragment processing pipeline 260.

The shader programs configure the fragment processing pipeline 260 to process fragment data by specifying computations and computation precision. Fragment shader 255 is optionally configured by fragment program instructions such that fragment data processing operations are performed in multiple passes within fragment shader 255. Fragment shader 255 includes one or more fragment shader pipelines which may be configured to perform shading functions such as, attribute interpolation, perspective correction, texture mapping, blending, and the like to produce shaded fragment data. Fragment shader 255 outputs the shaded fragment data, e.g., color and depth, and codewords generated from fragment program instructions to raster operations unit 265. Raster operations unit 265 includes a read interface and a write interface to memory controller 220 through which raster operations unit 265 accesses data stored in local memory 240 or host memory 212. Raster operations unit 265 optionally performs near and far plane clipping and raster operations, such as stencil, z test, blending, and the like, using the fragment data and pixel data stored in local memory 240 or host memory 212 at a pixel position (image location specified by x,y coordinates) associated with the processed fragment data. The output data from raster operations unit 265 is written back to local memory 240 or host memory 212 at the pixel position associated with the output data and the results, e.g., image data are saved in graphics memory.

When the data, program instructions, and commands received by graphics subsystem 270 have been completely processed by graphics processor 205, an output 285 of graphics subsystem 270 is provided using an output controller 280. Output controller 280 is optionally configured to deliver processed data to a display device, network, electronic control system, other computing system such as computing system 200, other graphics subsystem 270, or the like. Alternatively, the processed data is output to a film recording device or written to a peripheral device, e.g., disk drive, tape, compact disk, or the like.

In some embodiments of the present invention, driver 213 or a vertex shader program compiler may be configured to preprocess a vertex shader program and generate a modified vertex shader program that produces stereoscopic image pairs when executed by a processor, such as graphics processor 205 or host processor 214. Driver 213 or a vertex shader program compiler modifies the vertex shader program to compute an x coordinate value of each graphics primitive vertex for a first viewpoint, e.g., viewpoint 120, corresponding to a viewer's left eye and to compute a different x coordinate value of each graphics primitive vertex for a second viewpoint, e.g., viewpoint 115, corresponding to a viewer's right eye. In some embodiments of the present invention, the first viewpoint may correspond to the viewpoint that is used to produce the monoscopic image such that the monoscopic image and a first image of a stereoscopic image pair are equivalent. Therefore, the x computation is only changed to produce a second image of the stereoscopic image pair.

Figure 3:
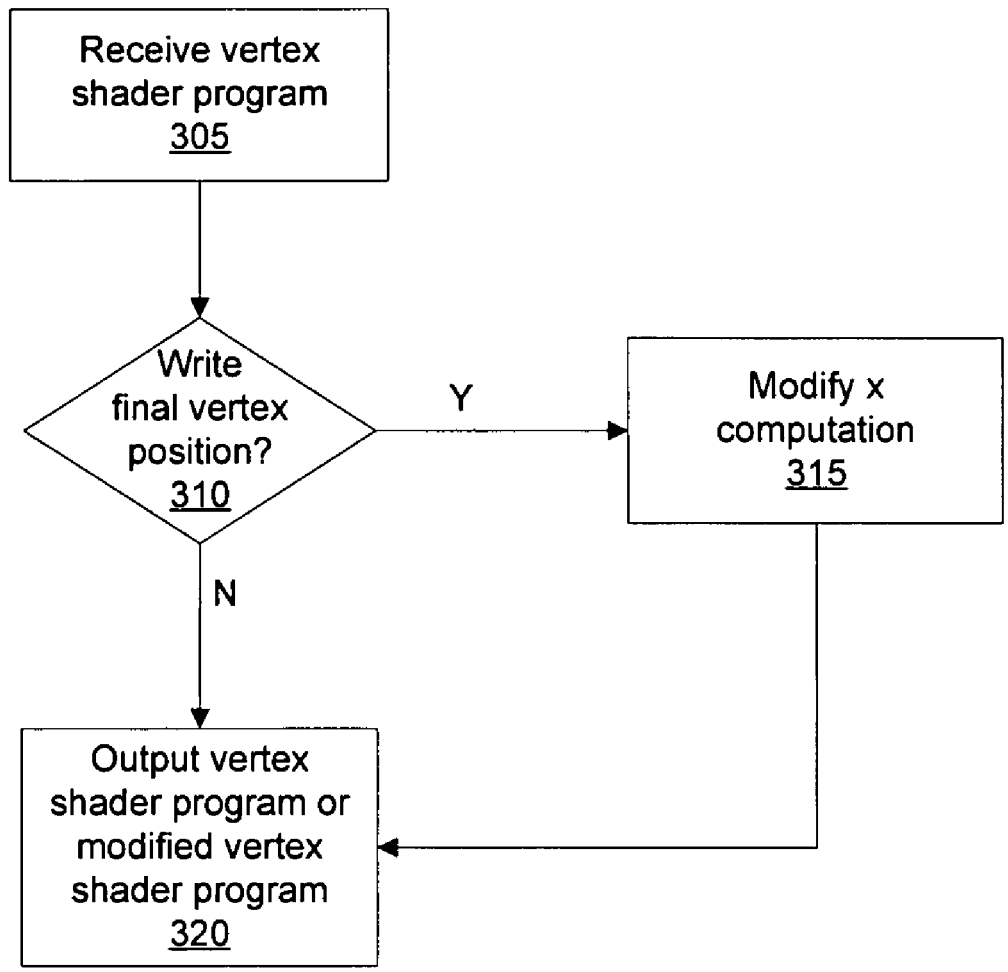
FIG. 3 illustrates a flow diagram of an exemplary method of modifying a vertex shader program to produce stereoscopic images in accordance with one or more aspects of the present invention.

FIG. 3 illustrates a flow diagram of an exemplary method of modifying a vertex shader program to produce stereoscopic images in accordance with one or more aspects of the present invention. In step 305 driver 213 receives a vertex shader program. In step 310 driver 213 identifies any program instructions within the vertex shader program that write a final vertex position, specifically an x coordinate value for a vertex of a graphics primitive. For example, in some embodiments of the present invention, a "MOV oPos" instruction is used to write a final vertex position, including x, y, z, and w coordinate values, of a graphics primitive.

If, in step 310 driver 213 identifies one or more program instructions that write a final vertex position, then in step 315 driver 213 modifies the computation used to generate the x coordinate value that is written by each of the one or more program instructions. For example, a program instruction that selects an unmodified x coordinate value when the first viewpoint is specified and that selects a modified x coordinate value when the second viewpoint is specified may be inserted into the vertex shader program. The method then proceeds to step 320

In one embodiment of the present invention, the following equation is used to compute the x coordinate value for vertices, where x is the unmodified x coordinate (the monoscopic x coordinate), c is a parameter, and f(w) is a depth function of the w (1/z) coordinate:

$$\text{final vertex } x \text{ coordinate} = x + c * f(w).$$

When the second viewpoint is specified, the parameter is set to a position value (corresponding to the right eye view) and when the first viewpoint is specified the parameter is set to a negative value (corresponding to the left eye view). The parameter value may be based on user-provided input, such as an input indicating a desired amount of stereo effect, i.e., perceived depth. The stereo effect may be increased by increasing the separation between the two viewpoints. An increased amount of stereo effect may result in viewer eye strain. It is therefore desirable to permit user control of the stereo effect. The parameter value may also be based on the size and/or resolution of the displayed image.

Figure 1:
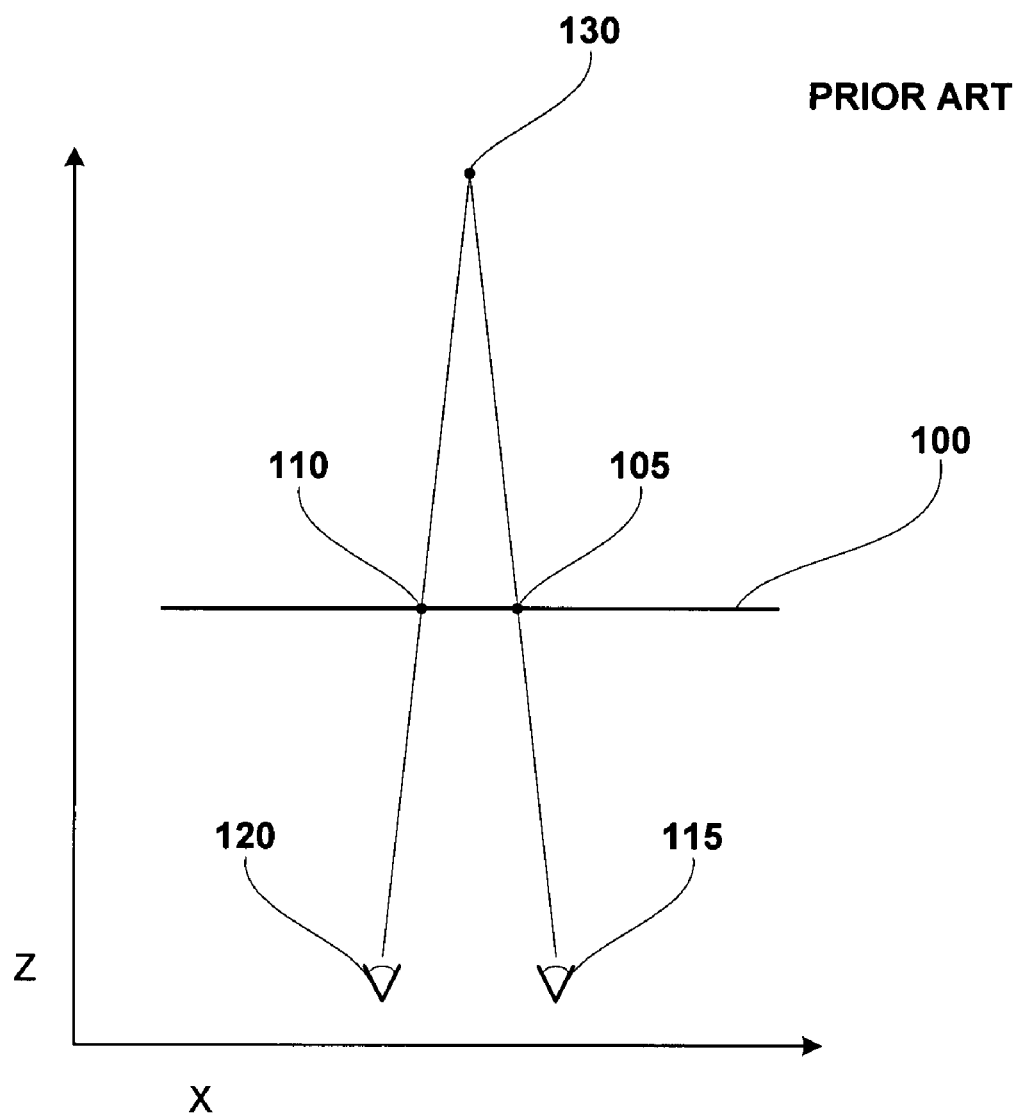
FIG. 1 is a conceptual diagram of a prior art stereoscopic image projection in accordance with one or more aspects of the present invention.

In some embodiments of the present invention f(w) is $1 - w/w_0$, where w is the distance between an object and the viewpoint and $w_0$ is the distance between the viewpoint and the display surface. For example, as shown in FIG. 1, w is the distance between viewpoint 120 and object 130 and $w_0$ is the distance between viewpoint 120 and point 110 for the first viewpoint. Similarly, w is the distance between viewpoint 115 and object 130 and $w_0$ is the distance between viewpoint 115 and point 105 for the second viewpoint.

If, in step 310 driver 213 does not identify any program instruction that writes a final vertex position, then the method proceeds directly to step 320. In step 320 driver 213 outputs the vertex shader program or the modified vertex shader program. The modified vertex shader program may then be executed by a processor to produce a pair of stereoscopic images, as described in conjunction with FIG. 4. Persons skilled in the art will appreciate that any system configured to perform the method steps of FIG. 3 or its equivalents, is within the scope of the present invention.

In other embodiments of the present invention, driver 213 may compile the vertex shader program to produce a modified vertex shader program that includes two vertex shader programs. A first vertex shader program in the modified vertex shader program corresponds to the first viewpoint and a second vertex shader program in the modified vertex shader program corresponds to the second viewpoint. The first vertex shader program is then executed to generate images corresponding to the first viewpoint and the second vertex shader program is executed to generate images corresponding to the second viewpoint.

Figure 4:
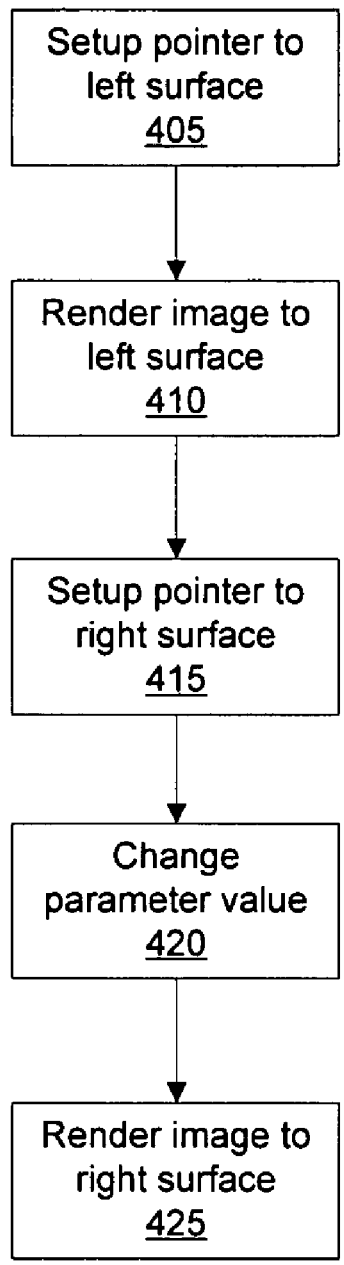
FIG. 4 illustrates a flow diagram of an exemplary method of processing a vertex shader program to produce stereoscopic images in accordance with one or more aspects of the present invention.

FIG. 4 illustrates a flow diagram of an exemplary method of processing a modified vertex shader program to produce stereoscopic images in accordance with one or more aspects of the present invention. In step 405 driver 213 sets up a pointer to a left surface which the first stereoscopic image, corresponding to the left eye viewpoint will be rendered into. The left surface may be stored in local memory 240 or in host memory 212 and the pointer specifies a location in memory where the image data should be stored. In step 410 a processor, such as host processor 214 or graphics processor 205 renders the first stereoscopic image and stores to the left surface. Rendering the first stereoscopic image includes execution of the modified vertex shader program that was output in step 320.

In step 415 driver 213 sets up a pointer to a right surface which the second stereoscopic image, corresponding to the right eye viewpoint will be rendered into. The right surface may be stored in local memory 240 or in host memory 212 and the pointer specifies a location in memory where the image data should be stored. In step 420 driver 213 changes the value of the parameter used to compute the x coordinate for graphics primitive vertices. The parameter value used to produce the second stereoscopic image is therefore different than the parameter value used to produce the first stereoscopic image. Specifically, the sign of the parameter may be negated to produce the second stereoscopic image. In step 425 a processor, such as host processor 214 or graphics processor 205 renders the second stereoscopic image and stores to the right surface. Rendering the second stereoscopic image includes execution of the modified vertex shader program that was output in step 320. Persons skilled in the art will appreciate that any system configured to perform the method steps of FIG. 3 or its equivalents, is within the scope of the present invention.

The parameter value may be programmed by driver 213 to produce the stereoscopic image pair. In some embodiments of the present invention, graphics processor 205 changes the parameter value based on whether the right or left stereoscopic image is being rendered. In either case, the vertex shader program is executed twice, once for each viewpoint, to produce the pair of stereoscopic images.

In some embodiments of the present invention, two vertex shader programs are generated by driver 213, and when executed, a first vertex shader program generates images for the left eye (first viewpoint) and a second vertex shader program generates images for the right eye (second viewpoint).

Figure 5:
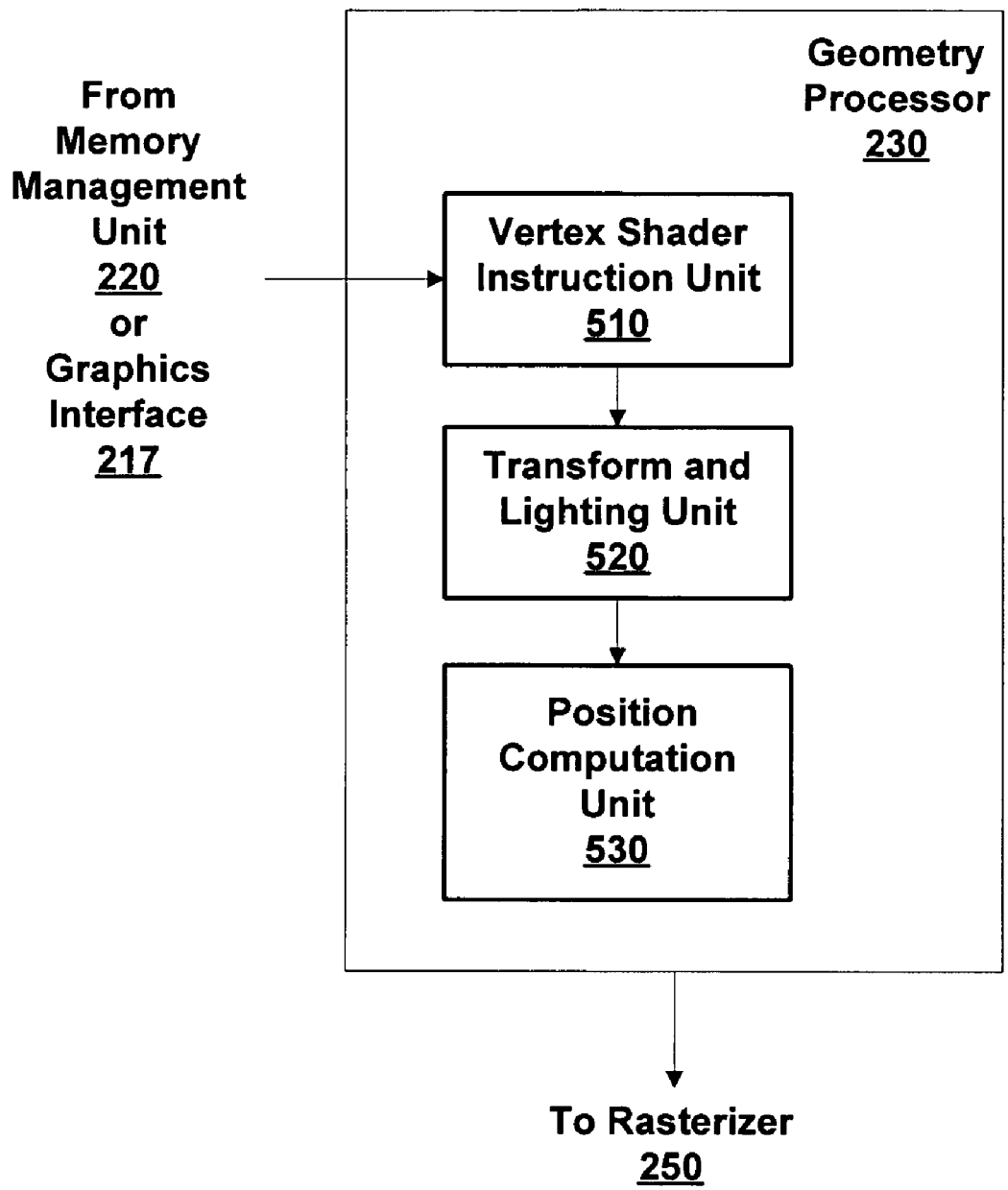
FIG. 5 is a block diagram of a portion of the graphics processor shown in FIG. 2 in accordance with one or more aspects of the present invention.

FIG. 5 is a block diagram of geometry processor 130 shown in FIG. 1 in accordance with one or more aspects of the present invention. Geometry processor 230 receives a stream of vertex shader program instructions and data from interface 217 or memory controller 220. The vertex shader program instructions configure subunits within geometry processor 230, such as vertex shader instruction unit 510, transform and lighting unit 520, and position computation unit 530, to process the data and produce graphics primitive data that is output to rasterizer 250.

Vertex shader instruction unit 510 parses the vertex shader program instructions and outputs microinstructions for execution by transform and lighting unit 520. In some embodiments of the present invention, vertex shader instruction unit 510 is configured to perform the steps 305, 310, 315, and 320 when a stereoscopic image generation mode is enabled. In those embodiments, vertex shader instruction unit 510 reads the vertex shader program twice, once to produce each stereoscopic image in a stereoscopic image pair.

Transform and lighting unit 520 performs transformation operations to convert graphics primitive data from object space to view space, outputting vertex coordinates for each graphics primitive to position computation unit 530. Transform and lighting unit 520 also performing lighting operations based on one or more light sources in object space, and outputs lighting parameters for each vertex to rasterizer 250. Position computation unit 530 computes an x coordinate value for each vertex of a graphics primitive and outputs the x coordinate values to rasterizer 250. In some embodiments of the present invention, position computation unit 530 stores a programmable parameter that is used to compute the x coordinate value. Driver 213 or vertex shader instruction unit 510 modifies the parameter based on whether the left eye view or the right eye view is being generated. In other embodiments of the present invention, vertex shader instruction unit 510 configures position computation unit 530 to compute the x coordinate value for either the left eye viewpoint or the right eye viewpoint and position computation unit 530 computes the corresponding x coordinate value.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A computer-implemented method of modifying a monoscopic image producing vertex shader program to generate stereoscopic images, comprising:

determining that a stereoscopic image generation mode is enabled;

identifying a vertex shader program instruction in the monoscopic image producing vertex shader program, wherein the vertex shader program instruction writes a final vertex position and computes a first x coordinate value for a vertex of a graphics primitive;

determining a first value of a parameter and a second value of the parameter based on a user-provided input that indicates a desired amount of stereo effect;

modifying the monoscopic image producing vertex shader program to generate a first vertex shader program associated with a first stereoscopic image of a stereoscopic image pair, wherein the first vertex shader program includes an instruction that, when executed, computes a second x coordinate value by summing the first x coordinate with a product of the first value of the parameter and a first depth value that indicates the difference between a distance between a first viewpoint and an object within the stereoscopic image pair and a distance between the first viewpoint and a surface on which the stereoscopic image pair is to be displayed;

modifying the monoscopic image producing vertex shader program to generate a second vertex shader program associated with a second stereoscopic image of the stereoscopic image pair, wherein the second vertex shader program includes an instruction that, when executed, computes a third x coordinate value by summing the first x coordinate with a product of the second value of the parameter and a second depth value that indicates the difference between a distance between a second viewpoint and the object and a distance between the second viewpoint and the surface;

executing the first vertex shader program to produce the first stereoscopic image of a stereoscopic image pair;

executing the second vertex shader program to produce the second stereoscopic image of the stereoscopic image pair; and displaying via a display device or storing in a memory the second stereoscopic image of the stereoscopic image pair.

2. The method of claim 1, wherein the parameter represents a distance between a first viewpoint corresponding to a first stereoscopic image and a second viewpoint corresponding to the second stereoscopic image.

3. The method of claim 1, wherein the first x coordinate is a monoscopic x coordinate and the first stereoscopic image equals a monoscopic image.

4. A system configured to modify a monoscopic image producing vertex shader program to generate stereoscopic images, comprising:

a memory storing a graphics device driver that is configured to:

determine that a stereoscopic image generation mode is enabled, identify a vertex shader program instruction in the monoscopic image producing vertex shader program, wherein the vertex shader program instruction writes a final vertex position and computes an x coordinate value for a vertex of a graphics primitive, determine a first value of a parameter and a second value of the parameter based on a user-provided input that indicates a desired amount of stereo effect;

modify the monoscopic image producing vertex shader program to generate first vertex shader program associated with a first stereoscopic image of a stereoscopic image pair, wherein the first vertex shader program includes an instruction that, when executed, computes a second x coordinate value by summing the first x coordinate with a product of the first value of the parameter and a first depth value that indicates the difference between a distance between a first viewpoint and an object within the stereoscopic image pair and a distance between the first viewpoint and a surface on which the stereoscopic image pair is to be displayed;

modify the monoscopic image producing vertex shader program to generate a second vertex shader program associated with a second stereoscopic image of the stereoscopic image pair, wherein the second vertex shader program includes an instruction that, when executed, computes a third x coordinate value by summing the first x coordinate with a product of the second value of the parameter and a second depth value that indicates the difference between a distance between a second viewpoint and the object and a distance between the second viewpoint and the surface; and a geometry processing unit configured to:

execute the first vertex shader program to produce the first stereoscopic image of a stereoscopic image pair, and execute the stereoscopic vertex shader program to produce the first stereoscopic image and the second stereoscopic image of the stereoscopic image pair.

5. The system of claim 4, wherein the parameter represents a distance between a first viewpoint corresponding to the first stereoscopic image and a second viewpoint corresponding to the second stereoscopic image.

6. The system of claim 4, wherein the first x coordinate is a monoscopic x coordinate and the first stereoscopic image equals a monoscopic image.

7. A system configured to modify a monoscopic image producing vertex shader program to produce stereoscopic images, comprising:

a memory; and a geometry processing unit including a vertex shader instruction unit that is configured to:

determine that a stereoscopic image generation mode is enabled;

determine a first parameter value and a second parameter value based on a user-provided input that indicates a desired amount of stereo effect;

read a stereoscopic vertex shader program that includes a first vertex shader program associated with a first stereoscopic image of a stereoscopic image pair and a second vertex shader program associated with a second stereoscopic image of the stereoscopic image pair, wherein the first vertex shader program includes an instruction that, when executed, computes a second x coordinate value by summing the first x coordinate with a product of the first value of the parameter and a first depth value that indicates the difference between a distance between a first viewpoint and an object within the stereoscopic image pair and a distance between the first viewpoint and a surface on which the stereoscopic image pair is to be displayed, and the second vertex shader program includes an instruction that, when executed, computes a third x coordinate value by summing the first x coordinate with a product of the second value of the parameter and a second depth value that indicates the difference between a distance between a second viewpoint and the object and a distance between the second viewpoint and the surface;

based on the first vertex shader program, configure a position computation unit within the geometry processing unit to compute a first x coordinate value for the vertex of the graphics primitive to produce a first stereoscopic image of a stereoscopic image pair using the first parameter value; and based on the second vertex shader program, compute a second x coordinate value for the vertex of the graphics primitive to produce a second stereoscopic image of the stereoscopic image pair using the second parameter value.

8. The system of claim 7, wherein the vertex shader program instruction is a move instruction that writes the x coordinate value for the vertex.

* * * * *